Dec. 19, 1967  F. KUHRT ET AL  3,359,492
HALL DEVICE FOR MEASURING ANGULAR SPEED AND
ANGULAR DISTANCE MOVED OF A ROTATING BODY
Filed March 18, 1965
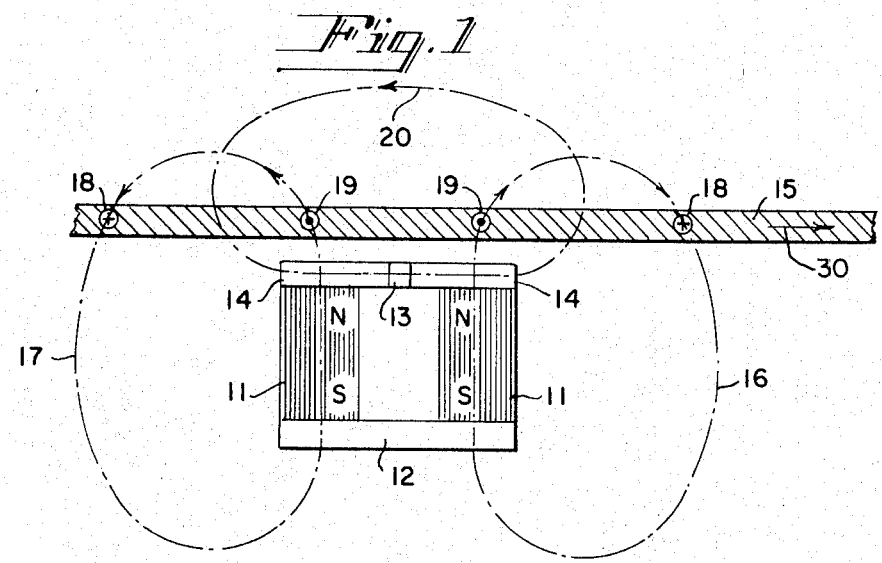
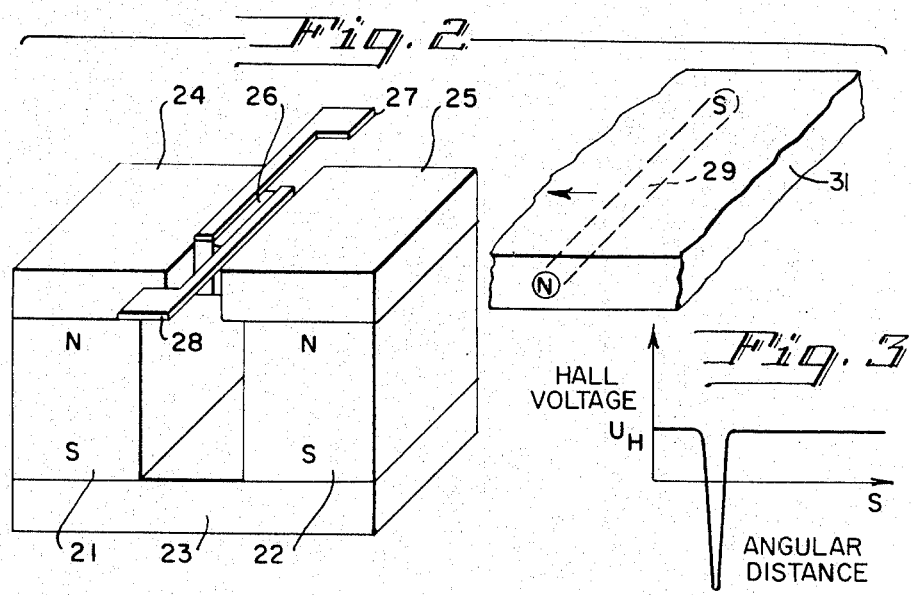

United States Patent Office 3,359,492
Patented Dec. 19, 1967

3,359,492
HALL DEVICE FOR MEASURING ANGULAR
SPEED AND ANGULAR DISTANCE MOVED
OF A ROTATING BODY
Friedrich Kuhrt and Julius Brunner, Nuremberg, Germany, assignors to Siemens-Schuckertwerke Aktiengesellschaft, Berlin-Siemensstadt, Germany a corporation of Germany
Filed Mar. 18, 1965, Ser. No. 440,769
Claims priority, application Germany, Mar. 20, 1964,
S 90,125
7 Claims. (Cl. 324—70)

ABSTRACT OF THE DISCLOSURE

A Hall device, positioned in the air gap between a pair of soft-magnetic plates, utilizes a pair of substantially L-shaped soft-magnetic sheets each positioned between a corresponding one of the soft-magnetic plates and the adjacent side of the Hall device. Each of the L-shaped sheets extends substantially perpendicularly to the direction of movement of a non-magnetic electrically conductive rotating body which supports at least one magnet. The soft-magnetic plates are each provided on the pole face of a corresponding one of a pair of magnets in proximity with the rotating body. The L-shaped sheets direct the lines of flux of the magnetic fields produced by eddy currents in the body and by the magnet supported by the body to be cut by the Hall device so that the Hall device produces a Hall voltage proportional to the angular speed of the body and a pulse each time the magnet supported by the body passes the pair of magnets to indicate the angular distance moved by the body.

---

The present invention relates to a device for measuring the angular speed and angular distance moved of a rotating body. More particularly, the invention relates to an eddy current-responsive magnetic device utilizing a Hall effect component for measuring the angular speed and angular distance moved of a rotating body.

The creation and measurement of eddy currents for the purpose of measuring the speed of a moving body is known. In a known system for measuring the speed of a linearly moving or rotating body utilizing the eddy current principle, a Hall generator is positioned in fixed stationary relation to magnets so that the Hall device is traversed by the field resulting from the eddy currents. The known system, however, does not enable a direct electrical measurement of distance without additional integrating means.

The principal object of the present invention is to provide a new and improved device for measuring the speed and angular distance moved of a rotating body.

An object of the present invention is to provide a device for measuring the speed and angular distance moved of a rotating body simultaneously without additional integrating means.

In accordance with the present invention, eddy currents proportional to speed are produced in a moving or rotating non-magnetic electrically conductive body by stationary magnets which produce a magnetic field which tranverses a Hall device or generator. Two parallel permanent magnets with the same direction of magnetization are positioned on a soft-magnetic base plate. Each of the pole faces of the permanent magnets positioned opposite the base plate is provided with a soft-magnetic plate so that an air gap is formed between the plates. A Hall device or generator is positioned in the air gap in the magnetic plane of symmetry of the permanent magnets. An L-shaped soft-magnetic sheet is positioned in each of the opposite sides of the Hall generator or device. At least one permanent magnet is carried by the rotating non-magnetic metal body the speed of which is to be measured. The sensitivity of the device of the present invention may be increased by utilizing a ferrite Hall generator as the Hall generator or device.

In order that the present invention may be readily carried into effect, it will now be described with reference to the accompanying drawing, wherein:

FIG. 1 is a schematic illustration of the basic principle of the speed and angular distance measuring device of the present invention;

FIG. 2 is a perspective view of an embodiment of the speed and angular distance measuring device of the present invention; and FIG. 3 is a graphical illustration of the signal voltage produced by the embodiment of FIG. 2.

FIG. 1 is a schematic illustration of the basic principle of a speed measuring device of the type described. A pair of spaced, parallel permanent magnets 11 have the same direction of magnetization. The magnets 11 are positioned with one end of each on a soft-magnetic plate 12. A soft-magnetic plate 14 is positioned on the pole face of each of the magnets 11 opposite the base plate 12.

A Hall device or generator 13, shown without its current input leads or terminals and without its Hall voltage output leads or terminals, for the purpose of maintaining the clarity of illustration, may comprise, for example, a ferrite Hall generator. The Hall device 13 is positioned in the air gap between the soft-magnetic plates 14. A movable or rotatable non-magnetic metal body 15 is to have its speed and angular distance of movement measured by the device of the present invention. The rotatable body 15 may comprise, for example, a disc or drum of copper or brass, for example.

The directions of the lines of flux of the magnetic fields of the permanent magnets 11 are indicated by loops 16 and 17 with the direction of magnetization indicated by the arrowheads on the loops. The directions of eddy currents produced in the non-magnetic metal body 15 are indicated by the direction-indicating symbols 18 and 19. The directions of the lines of flux of the magnetic field of the eddy currents are indicated by a loop 20 with the direction of magnetization indicated by the arrowhead on the loop.

When relative movement occurs between the non-magnetic body 15 and the magnets 11 such as, for example, in the direction of the arrow 30, due to rotation of said body, a voltage is produced in the said body 15. The voltage produced in the body 15 by movement of said body past the magnets 11 produces eddy currents, as indicated by the direction-indicating symbols 18 and 19. The eddy currents produce a magnetic field having lines of flux represented schematically by the loop 20 in FIG. 1. The magnetic field produced by the eddy currents is proportional in intensity to the speed of movement or rotation of the body 15. The lines of flux of the magnetic field produced by the eddy currents are cut by the Hall device 13 which produces a Hall voltage proportional to the speed of rotation of the body 15 at the Hall voltage leads or terminals thereof (not shown).

FIG. 2 is a perspective view of an embodiment of the speed and angular distance measuring device of the present invention. A pair of spaced, parallel permanent magnets 21 and 22 have the same direction of magnetization. The magnets 21 and 22 are positioned with one end of each on a soft-magnetic plate 23. A soft-magnetic plate 24 is positioned on the pole face of the magnet 21 opposite the base plate 23 and a soft-magnetic plate 25 is positioned on the pole face of the magnet 22 opposite the base plate 23.

A Hall device or generator 26, shown without its current input leads or terminals and without its Hall voltage output leads or terminals, for the purpose of maintaining the clarity of illustration, may comprise, for example, a ferrite Hall generator. The Hall device 26 is positioned in the air gap between the soft-magnetic plates 24 and 25.

A first L-shaped soft-magnetic sheet 27 is positioned between one side of the Hall device 26 and the adjacent side of the soft-magnetic plate 24. The soft-magnetic sheet 27 has an elongated stem portion positioned parallel and adjacent to the side of the soft-magnetic plate 24 for a part of its length and a base portion of greater width but considerably shorter length than said stem portion extending at a substantially right angle from the said stem portion. Part of the length of the stem portion and the entire base portion of the soft-magnetic sheet 27 are positioned spaced from the soft-magnetic plates 24 and 25, from the air gap therebetween and from the Hall device 26. The base portion of the soft-magnetic sheet 27 extends toward the soft-magnetic plate 25.

A second L-shaped soft-magnetic sheet 28 is positioned between the opposite side of the Hall device 26 and the adjacent side of the soft-magnetic plate 25. The soft-magnetic sheet 28 has an elongated stem portion positioned parallel and adjacent to the side of the soft-magnetic plate 25 for a part of its length and a base portion of greater width but considerably shorter length than said stem portion extending at a substantially right angle from the said stem portion. Part of the length of the stem portion and the entire base portion of the soft-magnetic sheet 28 are positioned spaced from the soft-magnetic plates 24 and 25, from the air gap therebetween and from the Hall device 26. The base portion of the soft-magnetic sheet 28 extends toward the soft-magnetic plate 24. Each of the first and second L-shaped soft-magnetic sheets 27 and 28 extends substantially perpendicularly to the direction of movement of the rotatable non-magnetic electrically conductive body 31.

A rotatable non-magnetic electrically conductive metal body 31, having a permanent magnet 29 positioned thereon or therein, is to have its speed and angular distance of movement measured by the device of the present invention. The magnet 29 is positioned substantially perpendicularly to the direction of movement of the body 31 and the magnets 21 and 22 are positioned substantially perpendicularly to the magnet 29. When the body 31 rotates or moves relative to the magnets 21 and 22, the lines of flux of the magnetic field of the permanent magnet 29 are cut by the soft-magnetic sheets 27 and 28 once per revolution of said body. The soft-magnetic sheets 27 and 28 direct the lines of flux to the Hall device 26 which then cuts said lines of flux.

In the embodiment of FIG. 2 of the present invention, the Hall device 26 produces, when cutting the lines of flux of the magnetic field produced by the eddy currents in the body 31, a Hall voltage proportional to the angular speed of said body at the Hall voltage leads or terminals thereof (not shown), in the manner explained with reference to FIG. 1. In addition to the speed-proportional Hall voltage, however, the Hall device 26 produces a pulse once per revolution of the body 31 each time the magnet 29 moves past the magnets 21 and 22. The polarity of the pulse is opposite to that of the speed-proportional Hall voltage, dependent upon the polarity of the magnet 29, and magnitude of said pulse exceeds the maximum magnitude of said speed-proportional Hall voltage.

The soft-magnetic sheets 27 and 28 function to direct the lines of flux of the magnetic field produced by the eddy currents in the body 31 and the lines of flux of the magnetic field produced by the magnet 29 to the Hall device 26 which cuts said lines of force. The Hall device 26 thus produces a Hall voltage which indicates the angular speed and the angular distance moved of the rotating body 31.

FIG. 3 illustrates the Hall voltage $U_H$ of the Hall device 26 as the ordinate and the angular distance S moved by the body 31 as the abscissa. The body 31 may comprise a disc or drum of non-magnetic metal such as, for example, copper or brass. As the body 31 rotates, the Hall voltage $U_H$ is proportional to its angular speed and the angular distance S moved by said body is indicated by the space between pulses; each pulse indicating one revolution of said body.

The mean value of the angular speed-proportional Hall voltage $U_H$ may be determined by any suitable means such as, for example, a moving coil meter. The pulse produced in the Hall voltage by the permanent magnet 29 may be amplified and fed to a mileage or footage recorder of any suitable means and by any suitable means.

A ferrite Hall generator is intended to mean a Hall generator having effective semiconductor layers comprising InSb and InAs, respectively, which Hall generator is positioned between two ferrite plates. The ferrite plates function to concentrate the flux lines of the magnetic field. These are not shown in the drawing.

While the invention has been described by means of a specific example and in a specific embodiment, we do not wish to be limited thereto, for obvious modifications will occur to those skilled in the art without departing from the spirit and scope of the invention.

We claim:

1. A device for producing an electrical signal corresponding to the angular speed and angular distance moved of a non-magnetic electrically conductive rotating body, comprising at least one magnet supported by said body substantially perpendicularly to the direction of movement of said body;

a soft-magnetic base plate spaced from said body;

magnet means for producing eddy currents in said rotating body, said magnet means comprising a pair of spaced substantially parallel magnets each having a pole face in operative proximity with said body and each having an opposite pole face positioned on said soft-magnetic base plate and spaced from said body, said magnets having the same direction of magnetization and being positioned substantially perpendicularly to the magnet supported by said body;

a pair of soft-magnetic plates each provided on the pole face of a corresponding one of said magnets in proximity with said body, said soft-magnetic plates being spaced from each other to form an air gap between them;

a Hall device positioned in the air gap between said soft-magnetic plates; and a pair of substantially L-shaped soft magnetic sheets each positioned between a corresponding one of said soft-magnetic plates and the adjacent side of said Hall device and each extending substantially perpendicularly to the direction of movement of said body for directing the lines of flux of the magnetic fields produced by said eddy currents in said body and by the magnet supported by said body to be cut by said Hall device so that said Hall device produces a Hall voltage proportional to the angular speed of said body and a pulse each time the magnet supported by said body passes said magnet means to indicate the angular distance moved by said body.

2. A device as claimed in claim 1, wherein each of said substantially L-shaped soft-magnetic sheets comprises an elongated stem portion positioned parallel and adjacent to the side of the corresponding soft-magnetic plate for a part of its length.

3. A device as claimed in claim 1, wherein each of said substantially L-shaped soft-magnetic sheets comprises an elongated stem portion positioned parallel and adjacent to the side of the corresponding soft-magnetic plate for a part of its length and a base portion of greater width and considerably shorter length than said stem portion extending at a substantially right angle from said stem portion.

4. A device as claimed in claim 1, wherein each of said substantially L-shaped soft-magnetic sheets comprises an elongated stem portion positioned parallel and adjacent to the side of the corresponding soft-magnetic plate for a part of its length and a base portion of greater width and considerably shorter length than said stem portion extending at a substantially right angle from said stem portion, part of the length of said stem portion and said entire base portion being spaced from said soft-magnetic plates, from said air gap between said soft-magnetic plates and from said Hall device.

5. A device as claimed in claim 4, wherein the base portion of each of said substantially L-shaped soft-magnetic sheets extends toward the soft-magnetic plate corresponding to the other of said substantially L-shaped soft-magnetic sheets.

6. A device as claimed in claim 5, wherein said Hall device comprises a ferrite Hall device.

7. A device as claimed in claim 1, wherein said Hall device comprises a ferrite Hall device.

References Cited

UNITED STATES PATENTS

| | | | |
|---|---|---|---|
| 3,179,856 | 4/1965 | Kuhrt | 324—45 |
| 3,226,631 | 12/1965 | Kuhrt | 324—45 |
| 3,229,202 | 1/1966 | Wenk | 324—70 |

RUDOLPH V. ROLINEC, *Primary Examiner.*

M. J. LYNCH, *Assistant Examiner.*